United States Patent Office

3,671,215
Patented June 20, 1972

3,671,215
SILVICIDAL COMPOSITION AND METHOD
Travis L. Bellsmith, Chicago, and Richard W. Fields, St. Charles, Ill., assignors to Velsicol Chemical Corporation, Chicago, Ill.
No Drawing. Continuation of abandoned application Ser. No. 632,893, Apr. 24, 1967. This application Jan. 2, 1970, Ser. No. 490
Int. Cl. A01n 9/00
U.S. Cl. 71—97                    9 Claims

ABSTRACT OF THE DISCLOSURE

A tree killing paste composition comprising a water-soluble salt of 3,6-dichloro-o-anisic acid or 4-amino-3,5,6-trichloropicolinic acid, a water-soluble acid methanearsonate salt and water in an amount such that the composition is a paste. A process for the killing of trees which comprises applying to the cambium layer thereof, in an amount which is silvicidally toxic to said trees, a composition of this invention.

---

This application is a continuation of application Ser. No. 632,893, filed Apr. 24, 1967, now abandoned.

In the practice of forestry it is common to kill trees that are to be removed. Various methods of using chemicals to kill the trees have been attempted and used with limited success. One such method is to spray the foliage of the tree with the chemical in liquid form. This method is of limited use where the foliage of trees that are to be killed are adjacent or intertwined with the foliage of the trees that are not to be killed or where precipitation and run-off or dripping of the chemical would undesirably harm plants in the area. Dormant spraying, i.e. spraying of trees after the leaves have fallen off, also has been used but this method requires high dosages of concentrated sprays and is inefficient since the chemical must penetrate by absorption through bark on the twigs and trunk.

A practical method of killing trees has been the cutting of the bark and pouring the chemical on the exposed part. The disadvantage of this method is that the killing agent is usually in liquid form and flows out of the cut before it is absorbed. To correct this, holes have been bored or punched into the tree and the chemical poured or spooned into the hole. The boring or punching of the holes requires considerable labor and expense. Moreover, spilling of the killing agent in liquid form is a constant hazard to both humans and animals and desirable plants. While the spilling can often be alleviated by using killing agents in solid form or by adding gelling and thickening agents to the liquid form of the chemicals, their action is often retarded thereby and in some cases the solid or thickening solution will not absorb into and translocate through the tree. Thus, there is a presently existing need for a composition and method by which the tree can be efficiently killed without having holes bored or punched therein and wherein the spilling hazard has been eliminated.

Therefore, it is one object of the present invention to provide a non-liquid tree killing composition.

It is another object of the present invention to provide a tree killing composition which is transported with the fluids in the tree but will not drip or flow away from a cutting through the bark of the tree.

Still another object of this invention is to provide tree killing compositions which contain only tree killing agents and water and does not contain gelling or thickening agents.

Still another object of this invention is to provide a process for efficiently killing a tree.

These and other objects and advantages of the present invention will be readily apparent from the following description.

Unexpectedly it was found that upon mixing two water-soluble salts with water, or mixing aqueous solutions of the water-soluble salt, as will be hereinafter described, there is produced a paste-like composition which is water-soluble and is effective in killing tress. This paste composition can be applied to a cut or notch through the bark of a tree by various means and will be retained therein due to its physical properties. The composition is absorbed by the tree and transported with its natural fluids resulting in the death of the tree.

The new compositions of the present invention comprise in combination a water-soluble salt of 3,6-dichloro-o-anisic acid or 4-amino-3,5,6-trichloropicolinic acid, a water-soluble monosubstituted salt of methanearsonic acid and water, wherein the water is present in amounts such that the compositions are of a pasty consistency. To obtain this consistency it has been found that the water comprises less than about 60 percent by weight of the total composition.

The process of the present invention for the production of the new tree killing composition comprises mixing a water-soluble salt of 3,6-dichloro-o-anisic acid or 4-amino-3,5,6-trichloropicolinic acid, a water-soluble acid methanearsonate salt and water, wherein the water comprises less than about 60 percent by weight of the mixture. Preferably aqueous solutions of the salts are mixed to produce the said compositions.

The water-soluble salt of 3,6-dichloro-o-anisic acid preferably is selected from the group consisting of the ammonium salt, the alkali metal salts and the amine salts wherein the amine component is selected from the group consisting of mono-, di- and tri-lower alkylamines and mono-, di and tri-lower alkanolamines. Exemplary of the suitable salts are ammonium 3,6-dichloro-o-anisate, sodium 3,6 - dichloro-o-anisate, potassium 3,6-dichloro-o-anisate, dimethylamine salt of 3,6-dichloro-o-anisic acid, triethylamine salt of 3,6-dichloro-o-anisic acid, diethylamine salt of 3,6-dichloro-o-anisic acid, diethanolamine salt of 3,6-dichloro-o-anisic acid, triethanolamine salt of 3,6-dichloro-o-anisic acid, the isopropylamine salt of 3,6-dichloro-o-anisic acid and the like. Some of the aqueous solutions of these salts are commercially available and all can be prepared by dissolving the salt in water.

The water-soluble salt of 4 - amino-3,5,6-trichloropicolinic acid, which may be used as a substitute for the water-soluble salt of 3,6-dichloro-o-anisic acid, preferably is selected from the group consisting of the ammonium salt, the alkali metal salts and the amine salts wherein the amine component is selected from the group consisting of mono-, di- and tri-lower alkylamines and mono-, di- and tri-lower alkanolamines. Exemplary of the suitable salts are the ammonium salt, the sodium salt, the potassium salt, the dimethylamine salt, the diethylamine salt, the triethylamine salt, the diethanolamine salt of 4-amino-3,5,6-trichloropicolinic acid. These salts can be obtained as described in Chemical Abstracts 61, 1838d (1964). Some of the aqueous solutions of these salts are commercially available and all can be prepared by dissolving the salt in water.

Preferably, the water-soluble acid methanearsonate salt is selected from the group consisting of water-soluble monoammonium and mono-alkali metal salts of methanearsonic acid. Exemplary of such salts are sodium acid methanearsonate, ammonium acid methanearsonate, potassium acid methanearsonate, and the like. The preparation of these salts are known in the art and the preferred aqueous solution of the sodium salt is commercially available.

As a preferred embodiment of this invention the ratio of the said salt of methanearsonic acid to the said salt of 3,6 - dichloro-o-anisic acid or 4-amino-3,5,6-trichloropicolinic acid is from about 1:1 to about 25:1; while it is even more preferred that the ratio of the said salt of methanearsonic acid to the said salt of 3,6-dichloro-o-anisic acid or 4-amino-3,5,6-trichloropicolinic acid is from about 1.5:1 to about 25:1.

The compositions of the present invention and their preparation and use will be more readily understood from the following examples which are presented by way of illustration and are not intended to limit the invention.

EXAMPLE 1

An aqueous solution (30 ml.) of the dimethylamine salt of 3,6-dichloro-o-anisic acid containing 4 pounds of the salt per gallon of solution was mixed with a 50.6% aqueous solution (70 ml.) of sodium acid methanearsonate in a small jar and stirred at room temperature. After a short time the resulting solution solidified to a white homogeneous paste.

EXAMPLE 2

An aqueous solution (30 ml.) of sodium 3,6-dichloro-o-anisate containing 4 pounds of the salt per gallon of solution was mixed with a 50.6% aqueous solution (70 ml.) of sodium acid methanearsonate in a small jar and stirred at room temperature. After a short time the resulting solution solidified to a white homogeneous paste.

EXAMPLE 3

An aqueous solution (30 ml.) of lithium 3,6-dichloro-o-anisate containing 4 pounds of the salt per gallon of solution was mixed with a 50.6% aqueous solution (70 ml.) of sodium acid methanearsonate in a small jar and stirred at room temperature. After a short time the resulting solution solidified to a white homogeneous paste.

EXAMPLE 4

A 24.9% aqueous solution (30 ml.) of the dimethylamine salt of 4-amino-3,5,6-trichloropicolinic acid containing 2 pounds of the salt per gallon of solution was mixed with a 50.6% aqueous solution (70 ml.) of sodium acid methanearsonate in a small jar and stirred at room temperature. After a short time the resulting solution solidified to a light brown, homogeneous paste.

EXAMPLE 5

A 24.9% aqueous solution (30 ml.) of potassium 4-amino-3,5,6-trichloropicolinate containing 2 pounds of the salt per gallon of solution is mixed with a 50.6% aqueous solution (70 ml.) of sodium acid methanearsonate in a small jar and stirred at room temperature. After a short time the resulting solution solidifies to a light brown, homogeneous paste.

EXAMPLE 6

An aqueous solution (30 ml.) of lithium 4-amino-2,3,6-trichloropicolinate containing 2 pounds of the salt per gallon of solution is mixed with a 50.6% aqueous solution (70 ml.) of sodium acid methanearsonate in a small jar and stirred at room temperature. After a short time the resulting solution solidifies to a light brown, homogeneous paste.

EXAMPLE 7

A 50% aqueous solution of the dimethylamine salt of 3,6-dichloro-o-anisic acid (40 ml.) was mixed with a 50.6% aqueous solution of sodium acid methanearsonate (60). Sufficient water was added to bring the water content up to 60% by weight based on the total composition. The mixture was stirred and allowed to stand at room temperature. After a period of about 1 day the solution solidified to a white paste not completely homogeneous.

Other combinations of the present invention can be prepared by the procedure of Examples 1–6. For example, aqueous solutions of the salts described in the following examples can be combined by the procedures of Examples 1–6 to form the composition of the present invention:

EXAMPLE 8

Ammonium 3,6-dichloro-o-anisate+sodium acid methanearsonate.

EXAMPLE 9

Ammonium 3,6-dichloro-o-anisate+ammonium acid methanearsonate.

EXAMPLE 10

Sodium 3,6-dichloro-o-anisate+ammonium acid methanearsonate.

EXAMPLE 11

Dimethylamine salt of 3,6-dichloro-o-anisic acid+ammonium acid methanearsonate.

EXAMPLE 12

Diethanolamine salt of 3,6-dichloro-o-anisic acid+sodium acid methanearsonate.

EXAMPLE 13

Ethanolamine salt of 3,6-dichloro-o-anisic acid+sodium acid methanearsonate.

EXAMPLE 14

Potassium 3,6-dichloro-o-anisate+sodium acid methanearsonate.

EXAMPLE 15

Dimethylamine salt of 3,6-dichloro-o-anisic acid+potassium acid methanearsonate.

EXAMPLE 16

Isopropylamine salt of 3,6-dichloro-o-anisic acid+sodium acid methanearsonate.

EXAMPLE 17

Ammonium 4-amino-3,5,6-trichloropicolinate+sodium acid methanearsonate.

EXAMPLE 18

Ammonium 4-amino-3,5,6-trichloropicolinate+ammonium acid methanearsonate.

EXAMPLE 19

Sodium 4-amino-3,5,6-trichloropicolinate+ammonium acid methanearsonate.

EXAMPLE 20

Dimethylamine salt of 4-amino-3,5,6-trichloropicolinic acid+ammonium acid methanearsonate.

EXAMPLE 21

Diethanolamine salt of 4-amino-3,5,6-trichloropicolinic acid+sodium acid methanearsonate.

EXAMPLE 22

Ethanolamine salt of 4-amino-3,5,6-trichloropicolinic acid+sodium acid methanearsonate.

EXAMPLE 23

Sodium 4-amino-3,5,6-trichloropicolinate+sodium acid methanearsonate.

EXAMPLE 24

Dimethylamine salt of 4-amino-3,5,6-trichloropicolinic acid+potassium acid methanearsonate.

In the following examples, the aqueous solutions described in Example 1 were mixed in the stated proportions, resulting in each case in a white paste composition:

| Example | Ml. solution | | Wt. percent | | |
|---|---|---|---|---|---|
| | Salt A | Salt B | Acid A | Salt B | Water |
| 25 | 6.25 | 93.75 | 1.95 | 48.80 | 49.25 |
| 26 | 10 | 90 | 3.15 | 47.28 | 49.57 |
| 27 | 20 | 80 | 6.46 | 43.07 | 50.47 |
| 28 | 40 | 60 | 13.60 | 34.00 | 52.40 |
| 29 | 50 | 50 | 17.45 | 29.10 | 53.45 |
| 30 | 30 | [1] 70 | 10.5 | 32.7 | 56.8 |

[1] 44.2% aqueous sodium acid methanearsonate solution.

NOTE.—Salt A=Dimethylamine salt of 3,6-dichloro-o-anisic acid; Salt B=Sodium acid methanearsonate; Acid A=3,6-dichloro-o-anisic acid.

In the following examples the aqueous solutions described in Example 5 were mixed in the stated proportion resulting in each case in a light brown paste composition:

| Example | Ml. solution | | Wt. percent | | |
|---|---|---|---|---|---|
| | Salt A | Salt B | Acid A | Salt B | Water |
| 31 | 20 | 80 | 3.3 | 42.8 | 53.9 |
| 32 | 40 | 60 | 7.0 | 34.1 | 58.9 |

NOTE.—Salt A=Potassium salt of 4-amino-3,5-6-trichlorophicolinic acid; Salt B=Sodium acid methanearsonate; Acid A=4-amino-3,5,6-trichloropicolinic acid.

The time required for the compositions of this invention to set up as a paste varies with the proportions in which the components are mixed. The time normally required for the composition to set up as a paste is less than about 36 hours; most often the compositions set up in less than about 6 hours. When the ratio of the salt of 3,6 - dichloro-o-anisic acid or 4-amino-3,5,6-trichloropicolinic acid to the acid methanearsonate salt exceeds about 1:1 and/or the water comprises an excess of about 60% by weight of the total composition, the compositions will not set up as a homogeneous paste but will remain liquid.

The process of the present invention of killing trees comprises applying to the cambium layer thereof, in an amount which is silvicidally toxic to said trees, a composition of the present invention. This process can be readily carried out, for example, by placing cuts in the tree, such as placing cuts in the trunk or branches into the cambium layer, suitably with an axe, and applying the composition of this invention by placing it into the cut. Applying the composition can be performed in a variety of ways, such as by applying it with a putty knife into the cut. Another way of applying the composition is by packing the composition into a caulking gun cartridge and applying from a caulking gun as one would apply caulking compound. Other ways of application will be readily apparent from the foregoing to those skilled in the art.

In order to demonstrate the effectiveness of the compositions of the present invention, horizontal cuts were made with an axe in the base of mature oak and hickory trees, each about 30 feet high, in a single band around the trunk of the tree. Each cut was approximately 1½ to 2 inches long and about 2 inches from the adjacent cut, and penetrated the cambium layer of the tree. The compositions indicated below were applied into the cuts at a rate of 1 ml. per cut with a putty knife. Three trees were used for each treatment. After about 2 weeks the trees showed symptoms of dying, and after 112 days, which included a summer growing season, injury to the trees was observed and rated on the percentage of dead or dying branches as follows:

PERCENT OF BRANCHES DEAD OR DYING [1]

| Composition, product of— | Chestnut Oak | Red Oak | White Oak | Hickory |
|---|---|---|---|---|
| Example: | | | | |
| 26 | 70 | 85 | 25 | [2] |
| 28 | 70 | 60 | 30 | 20 |
| 33 [3] | 70 | 70 | 25 | 30 |

[1] Average of three trees.
[2] Not tested.
[3] 11.1% (by volume) aqueous solution of the dimethylamine salt of 3,6-dichloro-o-anisic acid (2 lbs. salt/gal. solution) and the remainder 50.6% aqueous solution of sodium acid methanearsonate.

We claim:
1. A tree killing paste composition consisting essentially of a tree killing amount of a water-soluble salt of 3,6 - dichloro - o - anisic acid and a water-soluble acid methanearsonate salt in a ratio of from about 1:1 to about 25:1 by weight, respectively, and water in an amount such that the composition is a paste.

2. The composition of claim 1 wherein the water comprises less than about 60 percent by weight of the total composition.

3. The composition of claim 1 wherein the water-soluble acid methanearsonate salt is selected from the group consisting of monoammonium and mono-alkali metal salts of methanearsonic acid.

4. The composition of claim 1 wherein the water-soluble salt of 3,6-dichloro-o-anisic acid is selected from the group consisting of the ammonium salt, the alkali metal salts and the amine salts wherein the amine component is selected from the group consisting of mono-, di- and tri-lower alkylamines and mono-, di- and tri-lower alkanolamines.

5. The composition of claim 1 wherein the water-soluble acid methanearsonate salt is selected from the group consisting of water-soluble monoammonium and mono-alkali metal salts of methanearsonic acid and the water soluble salt of 3,6-dichloro-o-anisic acid is selected from the group consisting of its ammonium salt, its alkali metal salts and its amine salts wherein the amine component is selected from the group consisting of mono-, di- and tri-lower alkylamines and mono-, di- and tri-lower alkanolamines.

6. The composition of claim 5 wherein the acid methanearsonate salt is sodium acid methanearsonate and the salt is sodium acid methanearsonate and the salt of 3,6-dichloro-o-anisic acid is the dimethylamine salt of 3,6-dichloro-o-anisic acid.

7. The composition of claim 5 wherein the acid methanearsonate salt is sodium acid methanearsonate and the salt of 3,6-dichloro-o-anisic acid is sodium 3,6-dichloro-o-anisic acid.

8. The composition of claim 5 wherein the acid methanearsonate salt is sodium acid methanearsonate and the salt of 3,6-dichloro-o-anisic acid is the diethanolamine salt of 3,6-dichloro-2-anisic acid.

9. The process of killing trees which comprises applying to the cambium layer thereof, in an amount which is silvicidally toxic to said trees, a tree killing paste composition comprising a tree killing amount of a water-soluble salt of 3,6-dichloro-o-anisic acid and a water-soluble acid and a water-soluble acid methanearsonate salt in a ratio of from about 1:1 to about 25:1 by weight, respectively, and water in an amount such that the composition is a paste.

References Cited
UNITED STATES PATENTS 3,342,584    9/1967    Harnden et al.    71—97
3,444,192    5/1969    Newcomer    71—120 X
3,035,910    5/1962    Boyack    71—97

JAMES O. THOMAS, JR., Primary Examiner

U.S. Cl. X.R.

71—115, Dig-1